US009808691B2

United States Patent
Dascanio

(10) Patent No.: US 9,808,691 B2
(45) Date of Patent: Nov. 7, 2017

(54) LASER DISTANCE COMPARATOR FOR USE IN BALL GAMES UTILIZING A REFERENCE BALL

(71) Applicant: Gustavo A. Dascanio, Solvang, CA (US)

(72) Inventor: Gustavo A. Dascanio, Solvang, CA (US)

( * ) Notice: Subject to any disclaimer, the term of this patent is extended or adjusted under 35 U.S.C. 154(b) by 589 days.

(21) Appl. No.: 14/455,784

(22) Filed: Aug. 8, 2014

(65) Prior Publication Data
US 2016/0038810 A1 Feb. 11, 2016

(51) Int. Cl.
    *A63B 67/06* (2006.01)
    *G01S 17/88* (2006.01)
    *G01S 7/481* (2006.01)
    *A63B 71/06* (2006.01)
    *G01S 17/10* (2006.01)

(52) U.S. Cl.
    CPC .......... *A63B 67/068* (2013.01); *G01S 7/4813* (2013.01); *G01S 17/88* (2013.01); *A63B 71/0622* (2013.01); *A63B 2207/02* (2013.01); *A63B 2220/805* (2013.01); *G01S 17/10* (2013.01)

(58) Field of Classification Search
CPC .......... G01S 7/481; G01S 17/08; G01S 17/88; A63B 67/068
See application file for complete search history.

(56) References Cited

U.S. PATENT DOCUMENTS

| | | | |
|---|---|---|---|
| 2004/0051865 A1* | 3/2004 | Stierle | G01C 3/08 356/141.5 |
| 2004/0114129 A1* | 6/2004 | Gogolla | G01C 3/08 356/4.01 |
| 2005/0057745 A1* | 3/2005 | Bontje | G01C 15/002 356/139.03 |
| 2011/0116071 A1* | 5/2011 | Neary | A63B 67/068 356/3 |
| 2012/0105283 A1 | 5/2012 | Nyhart | |
| 2013/0097882 A1 | 4/2013 | Bridges et al. | |

\* cited by examiner

*Primary Examiner* — Luke Ratcliffe
(74) *Attorney, Agent, or Firm* — Felix L. Fischer

(57) ABSTRACT

A laser distance comparator incorporates a case housing a laser controller for producing a laser beam. The case has a handle and a button for engagement of a positioning device over a reference ball. A switch control is present on the case for activating the laser controller and a central processing unit (CPU) receives an input from the switch control, providing outputs to the laser controller to obtain a distance measurement to at least one competition ball.

13 Claims, 7 Drawing Sheets

LASER DISTANCE COMPARATOR FOR USE IN BALL GAMES UTILIZING A REFERENCE BALL

REFERENCE TO RELATED APPLICATIONS

This application is copending with application Ser. No. 13/946,957 filed on Jul. 19, 2013 entitled POSITIONING APPARATUS AND METHOD FOR DISTANCE MEASUREMENT having a common inventor and applicant with the present application, the disclosure of which is incorporated herein by reference.

BACKGROUND INFORMATION

Field

Embodiments of the disclosure relate generally to the field of ball games and more particularly to embodiments for a laser distance comparator having controls for comparative distance measurement to competition balls and a display for results of the comparison including nearest ball identification.

Background

Games which employ a reference ball and competition balls thrown or rolled to rest as closely as possible to the reference ball are highly popular. Bocce, Petanque and lawn bowling all employ this basic premise. In many cases visually estimated measurement of the resulting spread of competition balls from the reference ball to determine the closest ball or balls may be difficult and as competition increases, the need for accurate measurement becomes very important. Of key concerns are obtaining accurate measurements without moving the reference ball during the measurements and determining which competition ball is the "winning" ball closest to the reference ball.

Measuring devices such as string, telescoping rods, measuring tape, and lasers are commonly used to determine positions of competition balls relative to the reference ball in order to award points. These methods require that one end of the measuring device be placed extremely close to the horizontal edge of the reference hall without touching the ball. It is not uncommon to accidentally move the reference ball thus invalidating subsequent measurements and creating a disputable situation. Additionally, the accuracy of such devices may be insufficient in high level games.

Immediately after measuring a first competition ball, the measuring device must then be physically repositioned in order to measure a second competition ban This repositioning may alter or affect the accuracy of the measurements.

It is therefore desirable to provide a highly accurate distance comparator for placement over the reference ball without contacting or moving the reference ball which provides high accuracy of measurement from the reference ball to multiple competition balls.

SUMMARY

Exemplary embodiments provide a laser distance comparator incorporating a case housing a laser controller for producing a laser beam. The case has a handle and a button for engagement of a positioning device over a reference ball. A switch control is present on the case for activating the laser controller and a central processing unit (CPU) receives an input from the switch control, providing outputs to the laser controller to obtain a distance measurement to at least one competition ball.

The embodiments provide a method for measuring the distance of a competition ball from a reference ball by employing a laser distance comparator and using a handle to horizontally rotate the laser distance comparator. A selected ball is illuminated with the laser by activating a switch control and causing a laser distance measurement to be made. The measurement is stored in memory by a CPU and the CPU calculates the distance which is then displayed on a display.

The features, functions, and advantages that have been discussed can be achieved independently in various embodiments of the present invention or may be combined in yet other embodiments further details of which can be seen with reference to the following description and drawings

DETAILED DESCRIPTION

The embodiments described herein disclose a laser distance comparator usable with one hand to measure and compare the distance between a reference ball and two or more competition balls in order to award points in a game. The device is placed over a reference ball and rotated horizontally along a vertical axis from one measurement to the next. A display is provided which identifies the competition ball which is closest to the reference ball in order to award points.

Figure 1:
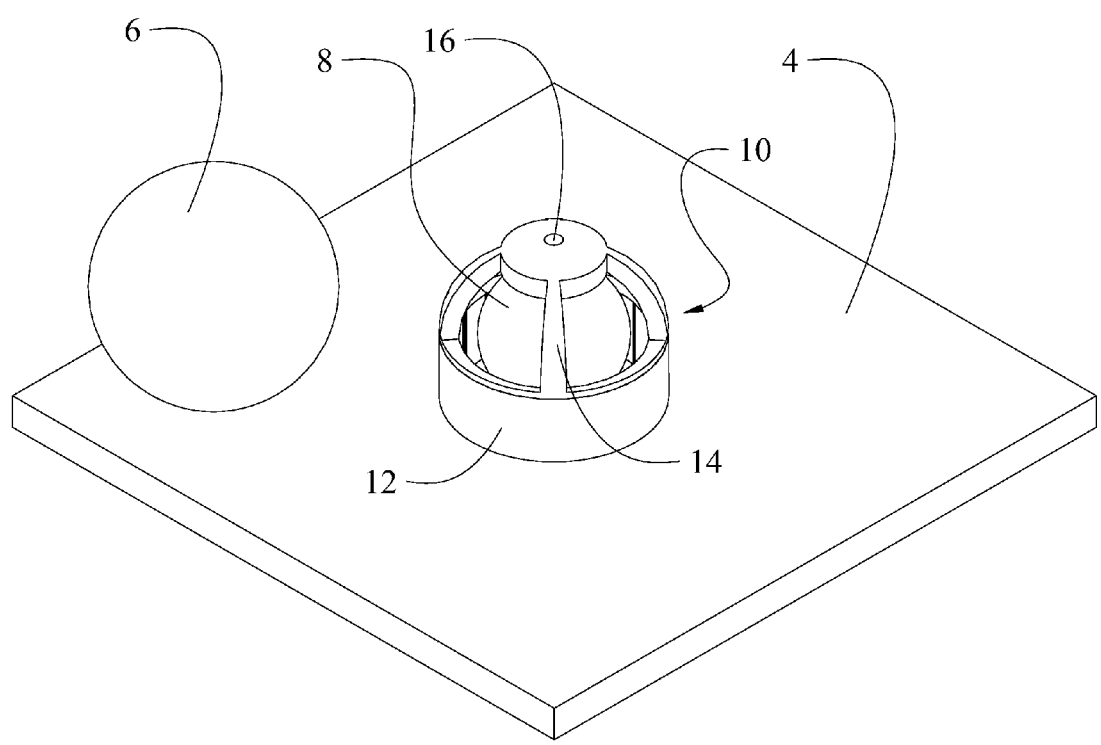
FIG. 1 is a pictorial view of a reference ball cover employable with embodiments of the present invention, installed over a reference ball on a playing surface with one example competition ball.

Referring to the drawings, FIG. 1 shows a playing surface 4 on which competition balls 6 are rolled or thrown in an attempt to be closest to a reference ball 8, the laser distance comparator is employed with a positioning device 10 which for an exemplary embodiment incorporates a cylindrical base 12 as a support for a hemispherical cap 14 having a mounting hole 16 centered over a vertical axis of the reference ball as disclosed in copending application Ser. No. 13/946,957.

Figure 2:
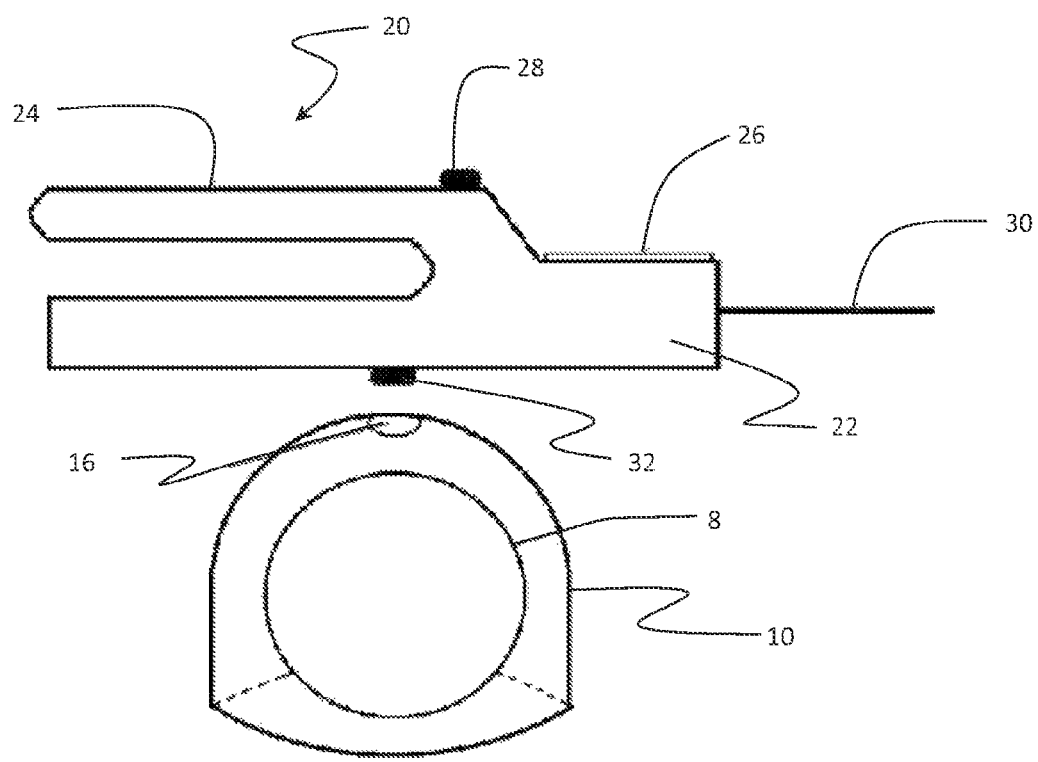
FIG. 2 is a side view of an embodiment of the laser distance comparator.

As shown in FIG. 2, a laser distance comparator 20 incorporates a low profile case 22 housing a laser and electronics to be described in greater detail subsequently. Supporting components such as batteries are also housed within the case 22. A grip handle 24 extends from a top of the case allowing one handed operation of the laser distance comparator 20. The handle also provides for ambidextrous operation of the laser distance comparator 20. A digital display 26, which will be described in greater detail subsequently, is provided on the top of the case 22. For one exemplary embodiment, a thumb switch 28 is employed for activation of the laser to provide a laser beam 30. The laser distance comparator 20, for the embodiment in the drawings, has a swivel pin or button 32 which is mountable in the swivel mounting hole 16 on the positioning device 10. In alternative embodiments, a pin may extend from the positioning device to be received in a mating hole in the case of the laser distance comparator. The swivel button 32 is adapted to be received in the hole 16 for rotatable movement of the laser distance comparator horizontally, about a perpendicular axis through the center of the reference ball with the positioning device 10 centered thereon, to obtain sequential measurements. The case may gimbaled on the swivel button to allow angular correction for the beam. The swivel button 32 (or hole in alternative embodiments) is positioned on the bottom of the case 22 on that laser distance comparator 20 is horizontally balanced. The low profile case 22 provides a low center of gravity and when mounted on positioning device 10, the height of laser beam 30 from the playing surface approximates an equatorial midpoint elevation on the associated competition balls.

Figure 3:
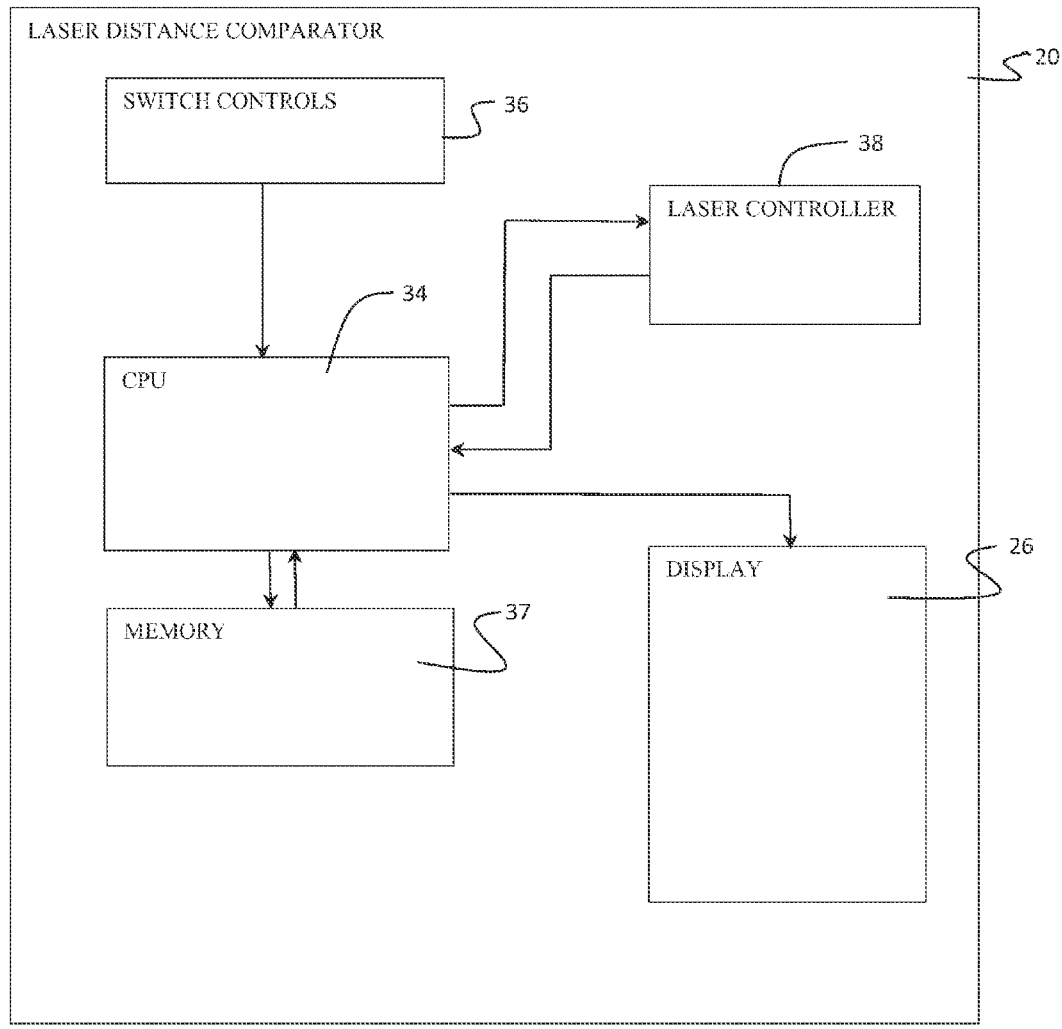
FIG. 3 block diagram of the operating components of the laser distance comparator.

As shown in FIG. 3, the laser distance comparator 20 incorporates a central processing unit (CPU) 34 which receives input signals from switch controls 36 such as thumb switch 28. The CPU 34 operates programmed software routines which may be stored in a memory 37. The software routines include the capability to monitor the switch controls 36 and, upon receipt of a specified signal, the CPU activates a laser controller 38. The laser controller may be turned on to provide the laser beam 30 as a continuous beam allowing the laser spot to illuminate the competition balls as the laser distance comparator is horizontally rotated about the swivel button. Upon selection of a desired competition ball, the laser controller may then issue a pulse for distance measurement to that ball, providing the relative distance data as an input to the CPU. Data on each competition ball may be taken and stored in memory 37 and upon a completion signal indicating all competition balls have been measured, the CPU provides an output to the display 26 for viewing. In certain embodiments, an intermediate output may be displayed realtime on the display as measurements are collected.

Figure 4A:
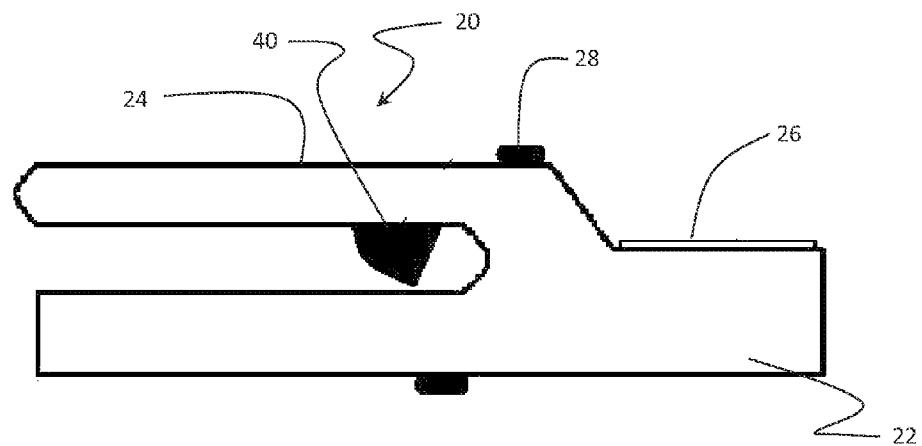
FIG. 4A is a side view of the laser distance comparator with a trigger element in a first position.
Figure 4B:
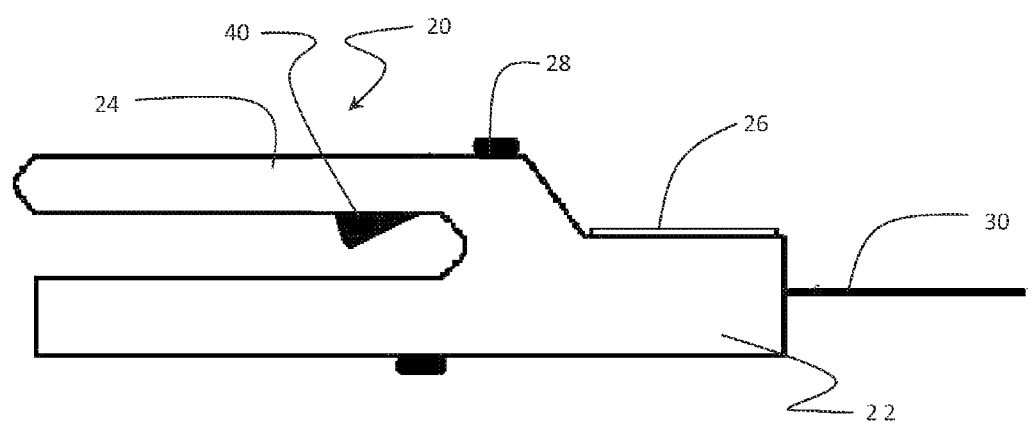
FIG. 4B is a side view of the laser distance comparator with a trigger element in a second position.
Figure 4C:
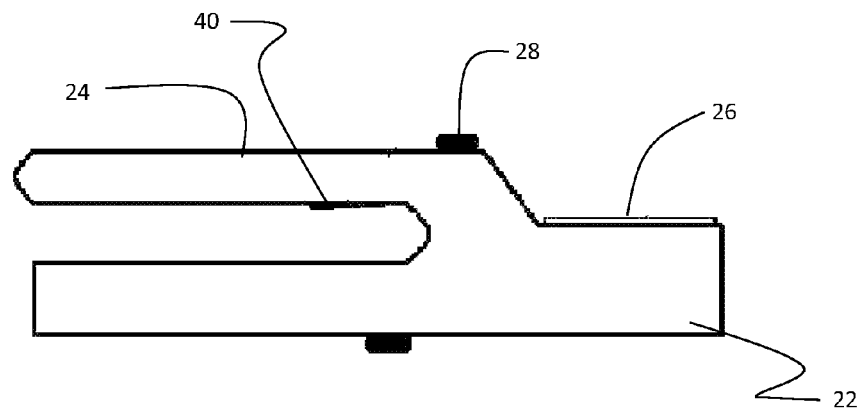
FIG. 4C is a side view of the laser distance comparator with a trigger element in a third position.

Control of designation of the competition balls and distance measurement with the laser may be accomplished through one of several switch control arrangements. A single thumb switch 28 as shown in FIG. 2 may be sequentially depressed to cycle through designation and measurement steps including turning the laser on or off designating a competition ball and causing a distance measurement to be obtained. A second arrangement is shown in FIGS. 4A-4C wherein a trigger switch 40 is mounted in the handle 24 for easy access with an index finger. Depressing the trigger switch 40 to a first detent position as shown in FIG. 4B may turn on the laser beam for illuminating the competition ball(s). Depressing the trigger switch 40 to a second fully depressed position as shown in FIG. 4C may then cause the pulsed laser distance measurement and storage of the data. While depressed positions from the initial undepressed state are shown for the trigger switch, multiple detents may be present to cause various signal inputs to the CPU. The trigger switch 40 may duplicate or share functional control with the thumb switch 28.

Figure 5A:
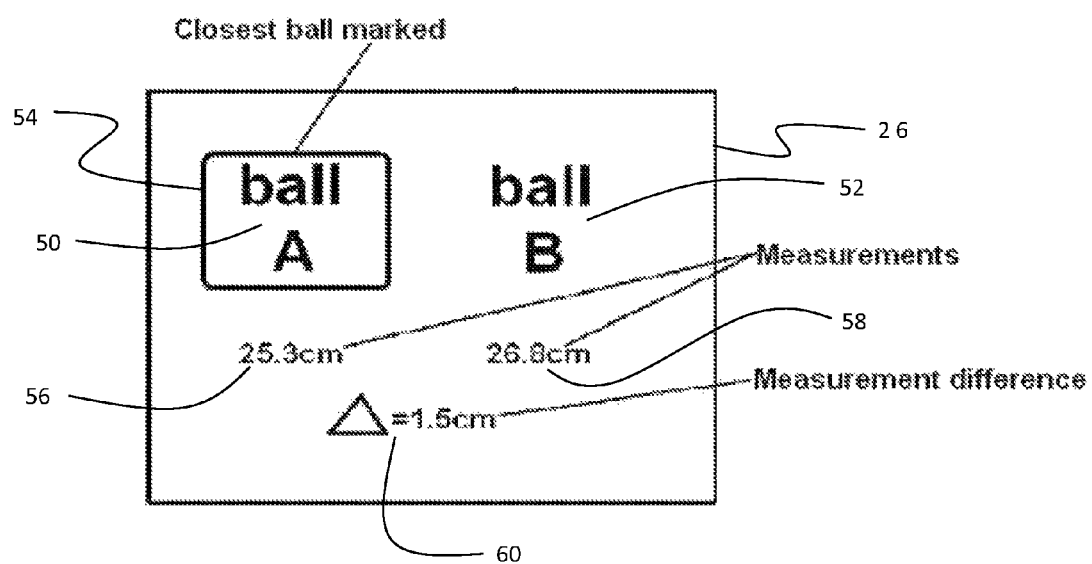
FIG. 5A is a top view of the display of the laser distance comparator showing an example distance determination.
Figure 5B:
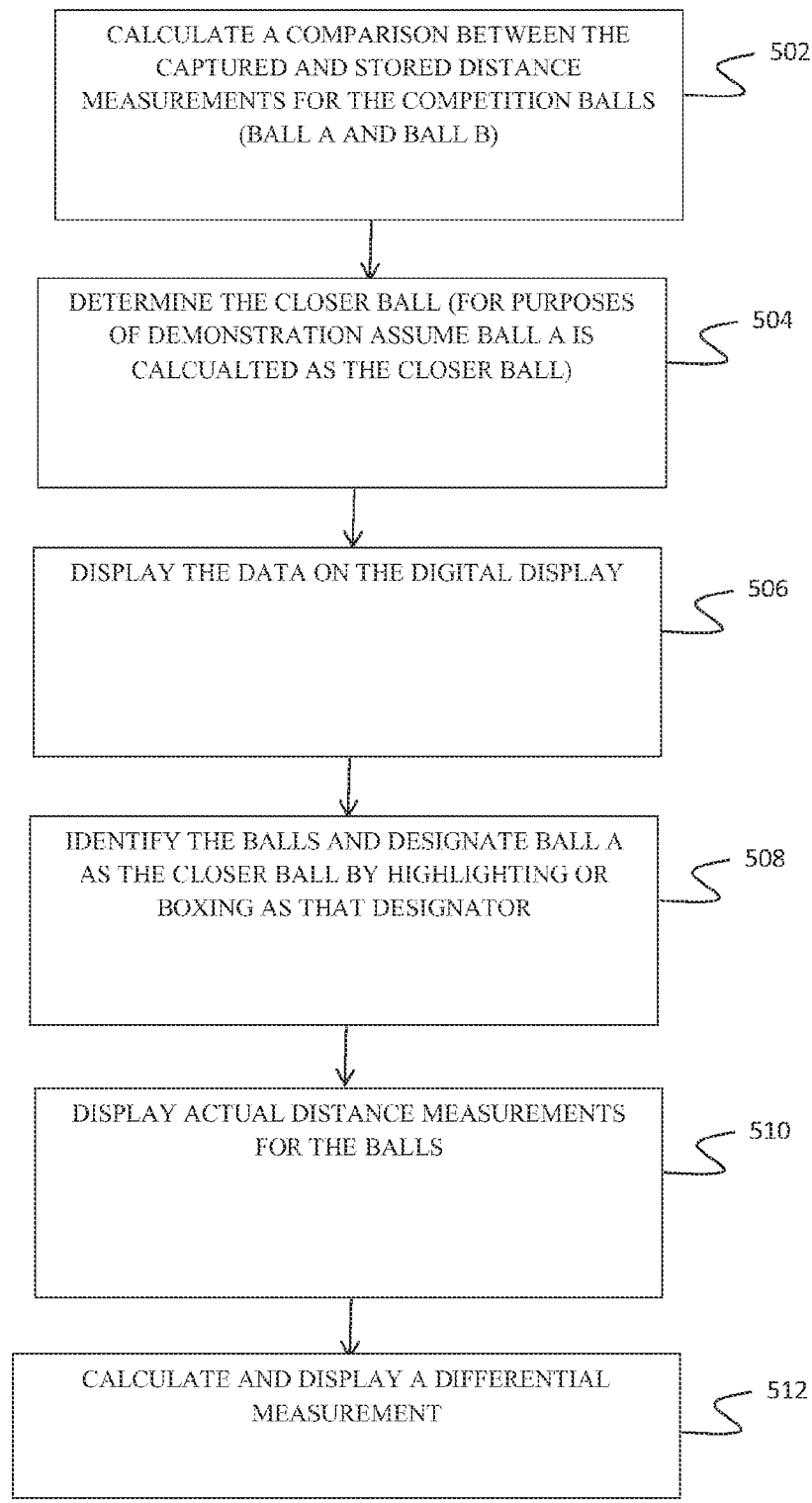
FIG. 5B is a flow chart of operation software subroutines in the central processing; and, FIG. 6 is an isometric view of the laser distance comparator with a removable handle.
Figure 6:
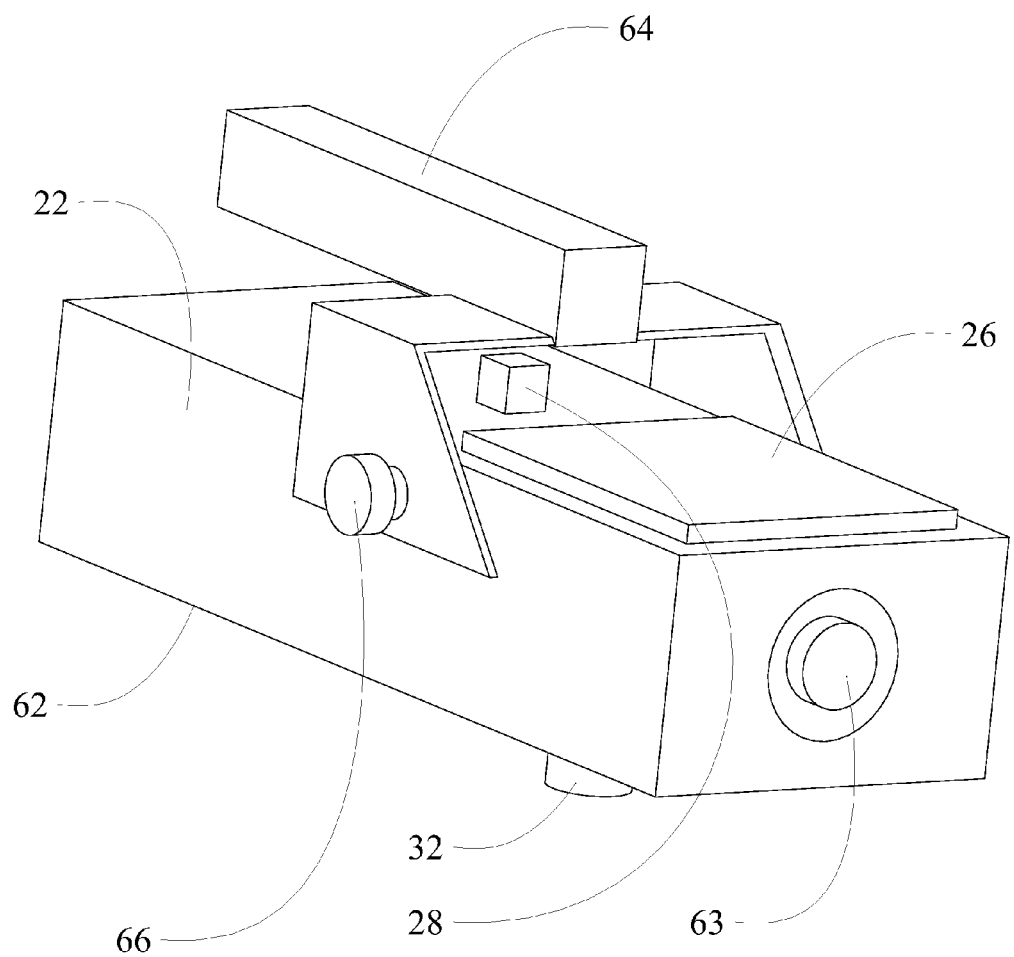

The CPU software routines are employed to calculate relative distance of designated competition balls from the reference ball. The data is then displayed on the digital display 26. As shown in FIG. 5A for a relevant scenario, the switch controls 36 (using thumb switch 28 and or trigger 40 as previously described) are employed to illuminate a first competition ball with the laser beam 30 through laser controller 38. The CPU designates that ball as "ball A" upon input from the switch controls. Upon a second input from the switch controls, the CPU causes the laser controller 38 to provide a pulsed distance measurement and the resulting data obtained by the laser controller is provided to the CPU and stored in memory, for the current example, 25.3 cm. The laser distance comparator is then aligned with a second competition ball the switch controls 36 (using thumb switch 28 and or trigger 40 as previously described) are employed to illuminate the second competition ball with the laser beam 30 through laser controller 38. The CPU designates that ball as "ball B" upon an input from the switch controls. Upon a second input from the switch controls, the CPU causes the laser controller 38 to provide a pulsed distance measurement and the resulting data obtained by the laser controller is provided to the CPU and stored in memory, for the current example, 26.8 cm. In various games/embodiments, this sequence can be repeated for numerous competition balls. Referring to FIG. 5B in conjunction with FIG. 5A, upon completion of the measurements, or in realtime as each measurement is completed, using the software routines the CPU calculates a comparison between the captured and stored distance measurements for the competition balls (ball A and ball B), step 502, and determines the closer ball, step 504. The data is displayed on the digital display, step 506, identifying the balls 50, 52 and designating ball A as the closer ball by highlighting or boxing 54 as that designator, step 508. Actual distance measurements 56, 58 may also be displayed, step 510, and a differential measurement 60 may be calculated by the CPU and displayed, step 512. The software routines in the CPU or hardware within the laser controller for the laser distance measurement may be internally adjustable (through software or other means as known in the art) to automatically compensate for aperture offset to correct the measured distance from the vertical axis of the reference ball.

For additional flexibility in use, the distance comparator may include a base unit 62 which includes the low profile case 22 housing the laser aperture 63 and electronics including the digital display 26, central processing unit (CPU) 34 and switch 28. A removable handle 64 is attachable to the case 22 thereby providing the functionality described with respect to FIG. 2. With the handle 64 removed, the low profile case may be more easily stored or may be used without the handle. The handle 64 may be attached with knurled thumb screws 66 or similar securing devise to allow easy attachment and removal.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:
1. A laser distance comparator comprising:
a case incorporating a laser controller for producing a laser beam;
at least one switch control for activating the laser controller;
a central processing unit (CPU) receiving an input from the at least one switch control and providing outputs to the laser controller to obtain a distance measurement to at least one competition ball;

a display mounted on the case, said CPU including software routines to cause the distance measurement to be displayed on the display;

a memory connected to the CPU and wherein a distance measurement is taken on multiple competition balls and the distance measurement for each competition ball is stored in the memory and displayed on the display; and, wherein the CPU includes software routines to identify the closest competition ball and to highlight a designator for the closest competition ball on the display.

2. The laser distance comparator as defined in claim 1 further comprising an ambidextrous handle.

3. The laser distance comparator as defined in claim 1 wherein the at least one switch control is a thumb switch.

4. The laser distance comparator as defined in claim 1 wherein the at least one switch control is a trigger switch.

5. The laser distance comparator as defined in claim 4 wherein the trigger switch has a first undepressed off position, a second partially depressed position providing an input to the CPU for said CPU to control the laser controller to turn on the laser and a third fully depressed position providing an input to the CPU for said CPU to control the laser controller to cause the laser to make a distance measurement.

6. The laser distance comparator as defined in claim 2 wherein the handle is removable.

7. The laser distance comparator as defined in claim 6 wherein the at least one switch control is located on the case.

8. A display system for a laser distance comparator for competition ball games comprising:

a central processing unit (CPU) receiving an input from at least one switch control and providing outputs to a laser controller to obtain a distance measurement to at least two competition balls, said CPU further incorporating a first software routine to identify the closest competition ball;

a memory connected to the CPU;

wherein a distance measurement is taken on multiple competition balls, said CPU including a second software routine to cause each distance measurement to be displayed on the display, the distance measurement for each competition ball is stored in the memory and displayed on the display, said first software routine causing a designator for the closest competition ball to be highlighted on the display by the CPU.

9. A display system for a laser distance comparator as defined in claim 8 further comprising:

software routines to calculate the differential distance between the competition balls and display said differential distance.

10. A laser distance comparator for competition ball games comprising:

a case incorporating a laser controller for producing a laser beam;

at least one switch control for activating the laser controller;

a removable handle attachable to the case;

a central processing unit (CPU) receiving an input from the at least one switch control and providing outputs to the laser controller to obtain a distance measurement to at least one competition ball;

a display mounted on the case;

a memory connected to the CPU wherein distance measurements taken on multiple competition balls and the distance measurement for each competition ball is stored in the memory, said CPU including a first software routine to cause each distance measurement to be displayed on the display; and, wherein the CPU includes a second software routine to identify the closest competition ball and highlight a designator for the closest competition ball on the display.

11. The laser distance comparator for competition ball games as defined in claim 10 further comprising:

a third software routine to calculate the differential distance between the competition balls and display said differential distance on the display.

12. The laser distance comparator for competition ball games as defined in claim 10 wherein the at least one switch control is a trigger switch.

13. The laser distance comparator as defined in claim 12 wherein the trigger switch has a first undepressed off position, a second partially depressed position providing an input to the CPU for said CPU to control the laser controller to turn on the laser and a third fully depressed position providing an input to the CPU for said SPU to control the laser controller to cause the laser to make a distance measurement.

* * * * *